United States Patent
Lefenfeld et al.

(10) Patent No.: US 11,608,274 B2
(45) Date of Patent: Mar. 21, 2023

(54) ALKALI METAL CYANIDE PRODUCTION

(71) Applicant: CYANCO CORPORATION, Sugar Land, TX (US)

(72) Inventors: Michael Lefenfeld, Sugar Land, TX (US); Robert Hoch, Hensonville, NY (US); Justin Manganaro, Sugar Land, TX (US); Roy Norcross, Sugar Land, TX (US); Si Kai Tan, Sugar Land, TX (US)

(73) Assignee: CYANCO CORPORATION, Sugar Land, TX (US)

( * ) Notice: Subject to any disclaimer, the term of this patent is extended or adjusted under 35 U.S.C. 154(b) by 0 days.

(21) Appl. No.: 17/374,370

(22) Filed: Jul. 13, 2021

(65) Prior Publication Data

US 2022/0017374 A1    Jan. 20, 2022

Related U.S. Application Data

(60) Provisional application No. 63/051,731, filed on Jul. 14, 2020.

(51) Int. Cl.
| | | |
|---|---|---|
| *C01C 3/10* | (2006.01) | |
| *B01J 19/24* | (2006.01) | |
| *B01D 53/14* | (2006.01) | |
| *B01D 53/54* | (2006.01) | |
| *B01D 53/78* | (2006.01) | |

(52) U.S. Cl.
CPC ............ *C01C 3/10* (2013.01); *B01D 53/1456* (2013.01); *B01D 53/1493* (2013.01); *B01D 53/54* (2013.01); *B01D 53/78* (2013.01); *B01J 19/24* (2013.01); *B01J 19/2465* (2013.01); *B01D 2252/10* (2013.01)

(58) Field of Classification Search
CPC ............ B01D 2252/10; B01D 53/1493; B01D 53/77; B01D 53/75; B01D 2257/408; B01D 2251/606; B01D 2251/304; B01D 53/1456; B01D 53/54; B01D 53/78; B01J 19/24; B01J 19/2465; C01C 3/10
See application file for complete search history.

(56) References Cited

U.S. PATENT DOCUMENTS

| | | | |
|---|---|---|---|
| 1,623,599 A * | 4/1927 | Jacobs ...................... | C01C 3/10 423/208 |
| 4,847,062 A | 7/1989 | Rogers et al. | |
| 4,902,301 A | 2/1990 | Rogers et al. | |
| 5,958,588 A | 9/1999 | Schutte et al. | |
| 6,162,263 A | 12/2000 | Day et al. | |
| 8,894,961 B2 | 11/2014 | Allison et al. | |
| 2014/0322803 A1 | 10/2014 | Constantz et al. | |

FOREIGN PATENT DOCUMENTS

| | | | | |
|---|---|---|---|---|
| DE | 2 344 918 A | * | 3/1974 | ............ B01D 53/54 |
| FR | 751 191 A | * | 8/1933 | ............... C01C 3/10 |

* cited by examiner

*Primary Examiner* — Timothy C Vanoy
(74) *Attorney, Agent, or Firm* — Raphael Bellum PLLC

(57) ABSTRACT

This disclosure relates to improved methods for alkali metal cyanide production, particularly to improved methods for sodium cyanide production. The improved method of producing sodium cyanide involves the step of contacting hydrogen cyanide with an aqueous solution of sodium carbonate or of a mixture of sodium carbonate and sodium bicarbonate to produce a sodium cyanide solution.

21 Claims, 8 Drawing Sheets

ALKALI METAL CYANIDE PRODUCTION

CROSS REFERENCE TO OTHER RELATED APPLICATIONS

This application claims benefit under 35 U.S.C. § 119(e) to U.S. Provisional Application No. 63/051,731 filed on Jul. 14, 2020.

TECHNICAL FIELD

This disclosure relates to an improved method and system for alkali metal cyanide production, for example sodium cyanide production.

BACKGROUND

Hydrogen cyanide (HCN) is a highly volatile, colorless, and extremely poisonous gas. Hydrogen cyanide is commercially used as a precursor to making alkali metal cyanides, like sodium and potassium cyanide, methyl methacrylate, methionine, chelators, like NTA and EDTA, among others. The dominant commercial reaction process for making hydrogen cyanide, known as the Andrussow process, is performed by mixing ammonia, a hydrocarbon stream typically comprising methane, and oxygen (often introduced using air) in the presence of a platinum (Pt), or Pt alloy, gauze catalyst to produce hydrogen cyanide according to reaction (1).

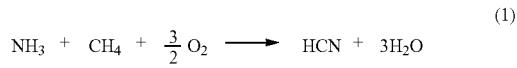

$$NH_3 + CH_4 + \frac{3}{2}O_2 \longrightarrow HCN + 3H_2O \quad (1)$$

Carbon dioxide and carbon monoxide are usually formed as co-products by methane oxidation and, if air is the source of the oxygen, the product gases contain nitrogen.

Hydrogen Cyanide is also produced as a by-product of certain petrochemical processes, such as ammoxidations. Acrylonitrile manufacture by ammoxidation of propylene is a significant source of by-product HCN. Depending on the source, by-product HCN may be liquid or vapor and of varying composition. HCN from acrylonitrile manufacture is often produced as a relatively pure liquid.

Sodium cyanide is usually produced via the absorption of hydrogen cyanide gas into an aqueous sodium hydroxide solution. Sodium cyanide is a commodity chemical used in the mining industry, among others, to extract gold and silver from the ore. It is sold either as an aqueous solution, typically between 25 and 35% sodium cyanide by weight, or as a solid between 97 and 99% purity. Aqueous sodium cyanide slurries are also used. See, for example, U.S. Pat. No. 4,902,301.

There have been few improvements in the production in alkali metal cyanides from hydrogen cyanide. There is a need in the art for a more efficient and cost-effective process for producing alkali metal cyanide. There is especially a need for more efficient and cost-effective production of sodium cyanide.

SUMMARY

This invention relates to an improved method for alkali metal cyanide production. An alkali metal cyanide is a cyanide of any of the Group 1 metals on the periodic table. The Group 1 metals include lithium, sodium, potassium, rubidium and cesium. This invention relates particularly to an improved method for lithium cyanide, potassium cyanide and sodium cyanide production and most particularly to sodium cyanide production.

The improved method of producing an alkali metal cyanide (e.g. lithium cyanide, LiCN; sodium cyanide, NaCN; or potassium cyanide, KCN) involves the step of contacting hydrogen cyanide containing gas with an aqueous solution of an alkali metal carbonate or of a mixture of an alkali metal carbonate and an alkali metal bicarbonate under reaction conditions sufficient to produce an alkali metal cyanide solution. Solid alkali metal carbonate or bicarbonate in excess of its solubility may be present in the liquid phase. The alkali metal bicarbonate and the alkali metal carbonate are selected depending upon the alkali metal cyanide being produced. The improved method is described below using sodium cyanide as an example.

The improved method of producing sodium cyanide involves the step of contacting hydrogen cyanide with an aqueous solution of sodium carbonate ($Na_2CO_3$) or of a mixture of sodium carbonate and sodium bicarbonate ($NaHCO_3$) under reaction conditions sufficient to produce a sodium cyanide solution. Solid sodium carbonate or bicarbonate in excess of its solubility may be present in and removed from the sodium cyanide solution.

DETAILED DESCRIPTION

Figure 1:
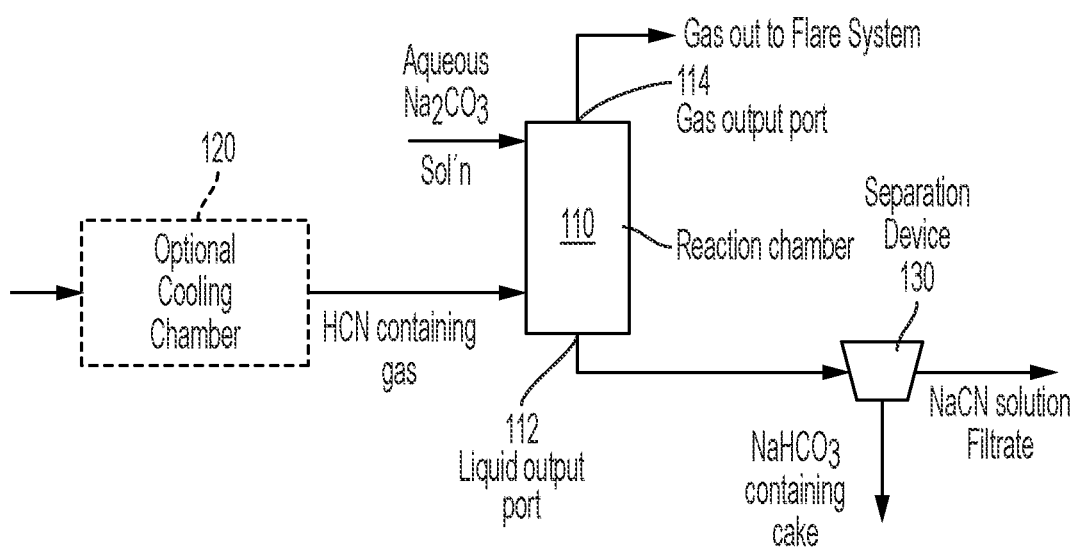
FIG. 1 shows a sodium bicarbonate precipitation process for producing NaCN solution using sodium carbonate as the primary sodium source.

This invention relates to an improved method for alkali metal cyanide production. That is, an improved method for the production of lithium cyanide, LiCN; sodium cyanide, NaCN; potassium cyanide, KCN; rubidium cyanide, RbCN; or cesium cyanide, CsCN. An improved method to produce lithium cyanide, LiCN; sodium cyanide, NaCN or potassium cyanide, KCN represent separate embodiments of the invention and the production of sodium cyanide, NaCN, a particular embodiment of the invention. While applicable to any alkali metal cyanide, the improved methods of the invention are described below, by way of example, for the production of sodium cyanide, NaCN, which is the most economically significant alkali metal cyanide. To produce other alkali metal cyanides the alkali metal bicarbonate and the alkali metal carbonate are selected depending upon the alkali metal cyanide being produced—e.g., lithium bicarbonate and lithium carbonate in the production of lithium cyanide or potassium bicarbonate and potassium carbonate in the production of potassium cyanide. Mixtures of alkali metal cyanides may be produced using mixtures of alkali metal bicarbonates and/or alkali metal carbonates.

The invention relates to methods for producing an alkali metal cyanide. A method of the invention comprising the step of contacting hydrogen cyanide with an aqueous solution of an alkali metal carbonate or of a mixture of alkali metal carbonate and alkali metal bicarbonate under reaction conditions sufficient to produce an aqueous alkali metal cyanide solution. The invention includes methods of producing an alkali metal cyanide by contacting hydrogen cyanide with an aqueous solution of an alkali metal carbonate or of a mixture of alkali metal carbonate and alkali metal bicarbonate in a reaction chamber under reaction conditions sufficient to produce an aqueous alkali metal cyanide solution, removing a gaseous effluent from the reaction chamber, removing the aqueous alkali metal cyanide solution from the reaction chamber as a liquid effluent, and separating any solid alkali metal bicarbonate produced in the contacting step from the aqueous alkali metal cyanide solution. The methods of the invention may be used to produce any alkali metal cyanide. In a method of the invention the alkali metal is lithium, sodium or potassium, or the alkali metal is sodium.

As a first step to producing an alkali metal cyanide according to the invention hydrogen cyanide is contacted with an aqueous solution of an alkali metal carbonate or of a mixture of alkali metal carbonate and alkali metal bicarbonate under reaction conditions sufficient to produce an aqueous alkali metal cyanide solution. The pH of the aqueous solution in the contacting step depends upon the chemical species present and may be alkaline. The hydrogen cyanide may be a hydrogen cyanide containing gas. Stoichiometric or excess hydrogen cyanide may be used to react all alkali metal carbonate or alkali metal bicarbonate present and yield higher purity alkali metal cyanide, i.e., without or containing only small or negligible amounts of alkali metal carbonate. Excess hydrogen cyanide in exemplary amounts of 1-20% excess, 3-15% excess, 5-10% excess and the like may be present.

In a method of producing an alkali metal cyanide of the invention, the pH of the aqueous alkali metal cyanide product solution should be alkaline, e.g. pH 8 or higher, to avoid cyanide polymerization. In a preferred method, the aqueous alkali metal cyanide product solution has an alkaline pH such as a pH between about 8-12, or between about 9-11, or between about 10-11, or between about 10-12. The pH may be adjusted using methods known in the art, such as adding base, preferably alkali metal hydroxide.

A method of producing an alkali metal cyanide according to the invention may have one or more additional steps. Unreacted alkali metal carbonate may be present in the aqueous alkali metal cyanide produced. Due to its relative insolubility alkali metal bicarbonate will typically be present as a solid and may be removed from the aqueous metal cyanide solution by filtering, centrifuging or other means know in the art. A method may have a step of converting the separated alkali metal bicarbonate to alkali metal carbonate in the presence of water and, optionally, recycling aqueous alkali metal carbonate to the contacting step.

A method may also have a step of removing excess hydrogen cyanide from the gaseous effluent. A step of removing hydrogen cyanide from the gaseous effluent from the reaction chamber may involve scrubbing the gaseous effluent. For example, hydrogen cyanide in the gaseous effluent may be scrubbed by passing the effluent through aqueous NaOH or $Na_2CO_3$ which produces an aqueous solution of sodium cyanide. Alternatively, the hydrogen cyanide may be scrubbed with an aqueous solution of a different base to produce an aqueous solution of another desired cyanide from the hydrogen cyanide in the effluent stream. For example, aqueous KOH may be used to produce potassium cyanide or aqueous $Ca(OH)_2$ may be used to produce calcium cyanide. The aqueous solution of the cyanide thus produced may be removed as a liquid effluent and recovered in its own recovery system.

A method of the invention may also include the step of removing water from an aqueous alkali metal cyanide solution produced to form a cake of the alkali metal cyanide. If a base such as $Ca(OH)_2$ is used to scrub the gaseous effluent and produce an aqueous solution of calcium cyanide water may be removed to form a cake of the cyanide. Water removal from an aqueous solution may be accomplished by means known in the art.

The improved methods for alkali metal cyanide production of the invention are now discussed in terms of sodium cyanide production as an exemplary embodiment. Ideally, the reaction of hydrogen cyanide (HCN) with sodium carbonate ($Na_2CO_3$) would proceed according to reaction (2). Reaction (2) generates only benign co-products and is driven by carbon dioxide ($CO_2$) removal.

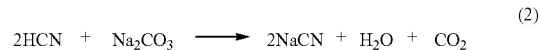

$$2HCN + Na_2CO_3 \longrightarrow 2NaCN + H_2O + CO_2 \tag{2}$$

It is likely, however, that when combining hydrogen cyanide and sodium carbonate that the initial reaction may be reaction (3). Reaction (3) presents an undesirable scenario because sodium utilization is only 50% and sodium bicarbonate ($NaHCO_3$) is a potentially difficult co-product to remove.

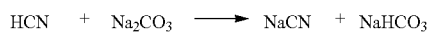

$$HCN + Na_2CO_3 \longrightarrow NaCN + NaHCO_3$$

Reaction (4) represents the well-known decomposition of sodium bicarbonate. Reaction (4) requires only time and temperature to proceed and can be driven by $CO_2$ removal.

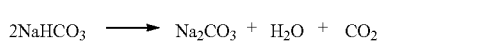

$$2NaHCO_3 \longrightarrow Na_2CO_3 + H_2O + CO_2 \tag{4}$$

If Reaction (4) and Reaction (2) are carried out simultaneously, the net effect is Reaction (5)

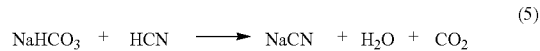

$$NaHCO_3 + HCN \longrightarrow NaCN + H_2O + CO_2 \tag{5}$$

In an improved method for sodium cyanide production according to this invention, the method involves the step of contacting hydrogen cyanide (HCN) with an aqueous solution of sodium carbonate ($Na_2CO_3$), or of a mixture of sodium carbonate ($Na_2CO_3$) and sodium bicarbonate ($NaHCO_3$) under reaction conditions to produce an aqueous sodium cyanide solution. Solid phase $Na_2CO_3$ or $NaHCO_3$ in excess of their solubility may be present in the liquid phase. In other words, the aqueous solution may be a saturated solution.

In a method of the invention the reactions to produce NaCN are understood to proceed as shown in reactions (2) and (5) above to produce an aqueous solution of NaCN. $CO_2$ is a product of the reactions. Both reactions are reversible. Thus, it may be advantageous to remove $CO_2$ from the liquid phase, that is, the aqueous NaCN solution produced. Preferably, a method of the invention and consequently the reactions in it are carried out as a continuous reaction process. Advantageously, the HCN, optionally excess HCN, is brought into contact with an aqueous $Na_2CO_3$ solution or an aqueous $Na_2CO_3/NaHCO_3$ solution and a gaseous effluent, containing for example $CO_2$, optionally excess HCN and other gaseous components, is removed.

The HCN may be fed directly from another process, such as the Andrussow process or as a by-product stream from another chemical process, and may be an HCN-containing gas where the other gaseous components such as a gas typically recognized as an inert gas or a gas that is inert in the context of a method of producing NaCN according to the invention. Both the incoming and outgoing gases may contain other components such as nitrogen, oxygen, ammonia, methane, etc. such as when the source of the HCN containing gas is produced using the Andrussow process.

A method for producing sodium cyanide according of the invention may be carried out in the exemplary equipment disclosed or other equipment known in the art. A method of this invention may be carried out at room or ambient temperature, but if the HCN is at elevated temperature, it may be cooled prior to the contacting step. Preferably the gas fed to the reaction chamber is at less than 450° C., more preferably less than 350° C. and still more preferably less than 250° C. To the extent that the gas feed to the reaction chamber is hotter than the temperature of the reaction chamber it will be further cooled therein, and this cooling will be accompanied by volatilization of liquid phase components.

In a preferred embodiment, HCN or an HCN containing gas is fed into a reaction chamber to contact an aqueous solution of sodium carbonate or an aqueous solution of sodium carbonate and sodium bicarbonate. An HCN containing gas may be a gas containing about 5-25 vol. %, about 5-15 vol. % or about 8 vol. % HCN, typical of what would be produced by the Andrussow process. Water is volatilized and carried off along with the $CO_2$ produced in the reaction in an effluent gas stream. Other components, such as nitrogen and oxygen, may also be present in the feed and effluent gas streams. The concentration of sodium cyanide produced may optionally exceed its solubility and, if desired, the sodium cyanide may be recovered as a solid. A liquid phase product comprising sodium cyanide is withdrawn from the reaction zone.

FIGS. 1 through 6 show schematic depictions of various methods according to the invention to produce sodium cyanide, NaCN. Process equipment not central to the discussion have been omitted. Thus, it is understood to one skilled in the art that pumps, heat exchangers, and tanks not shown in FIGS. 1 through 6 may be necessary. The conversion of HCN to NaCN solution is complex. It includes the steps of HCN absorption in aqueous liquid, the reaction of the gas with sodium ion and possibly the dissociation of the dissolved HCN into $H^+$ and $CN^-$ ions. Thus, the reaction chamber in which this chemistry occurs may be characterized as an absorber, a scrubber, a contactor or a reactor. We refer to it as a reaction chamber, but it should be understood that all of the steps just described and more may take place in this reaction chamber.

FIG. 1 shows a flow sequence implementing this invention. HCN, such as an HCN containing gas produced by the Andrussow process is contacted with an aqueous $Na_2CO_3$ solution in a reaction chamber 110. The incoming HCN containing gas is optionally cooled below Andrussow reaction temperature by cooling chamber 120 before being fed to the reaction chamber 110. If the feed gas is at an elevated temperature, significant water vaporization may occur. If the HCN is not coming from an Andrussow process, the gas temperature may be adjusted to a desired temperature for the method of the invention. A gas and a liquid product leave the reaction chamber 110 via gas output port 114 and liquid output port 112, respectively. The gas phase effluent leaving gas output port 114 contains less HCN than the feed gas. The leaving gas may be fed to an absorber as discussed above and/or to a flare system (not shown) to remove any HCN contained in the gas phase effluent.

Sodium bicarbonate, produced according to reaction (3), may be present in the liquid effluent in excess of its solubility. The liquid effluent from liquid output port 112 of the reaction chamber 110 should contain as little $Na_2CO_3$ as possible thereby yielding higher purity NaCN. Preferably at least 90% of the total $Na_2CO_3$ fed to the reaction chamber 110 is reacted; more preferably 95%; more preferably 98%. Any solid sodium bicarbonate present may be separated from the liquid effluent by separation device 130 using settling, filtration, or centrifugation, for example, leaving a NaCN solution filtrate or supernatant. The sodium bicarbonate cake from this separation may contain significant cyanide values and must be handled accordingly. Preferably, any $NaHCO_3$ in this cake is subsequently converted to $Na_2CO_3$.

The reaction chamber 110 may be a tray or a packed absorption column. A tray column is preferred. Alternatively, the contacting may take place in an empty of baffled vessel. This vessel may be adiabatic or may optionally be cooled by circulating a slipstream of the liquid product from liquid outlet port 112 through a heat exchanger and returning the cooled slipstream to the reaction chamber.

A contacting temperature may range from ambient temperature (generally about 25° C., standard temperature) and is preferably ambient to less than 100° C., more preferably ambient to less than 80° C., and more preferably ambient to less than 40° C. The contacting temperature is the temperature inside the reaction chamber 110, which is usually within a few degrees of the temperatures of the liquid and gaseous effluent streams (leaving via liquid output port 112, and gas output port 114, respectively.

Figure 2:
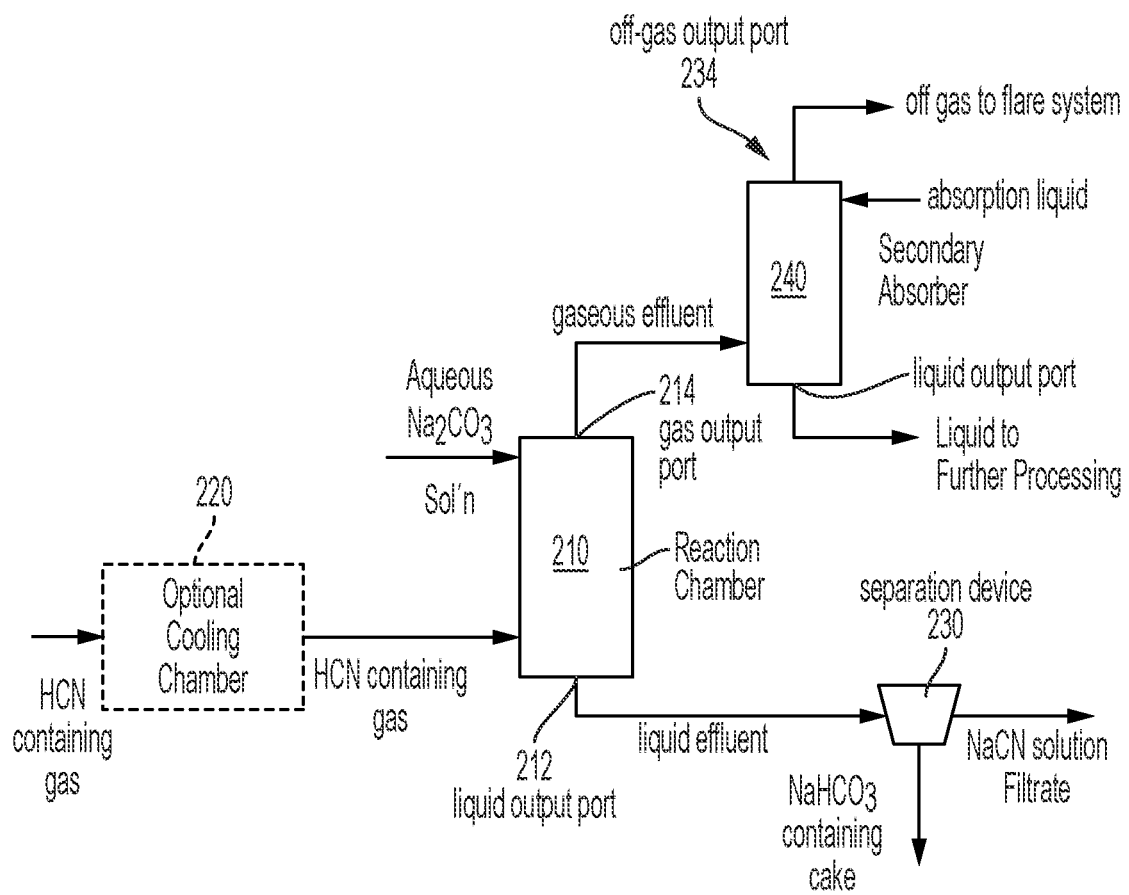
FIG. 2 shows a sodium bicarbonate precipitation process for producing NaCN solution using sodium carbonate as the primary sodium source with a secondary absorber to maximize recovery of HCN.

FIG. 2 shows the additional feature of a secondary absorber 240. The secondary absorber 240 may use any means known in the art to absorb HCN from the gaseous effluent of reaction chamber 210. Preferably an aqueous base reacts with residual HCN in the contacting zone gaseous effluent received from gas output port 214 of the reaction chamber 210. Off-gas from the secondary absorber 240 is preferably free of HCN and is sent to a flare system (via off gas output port 234) such as conventionally employed for cyanide process off-gas.

Figure 3:
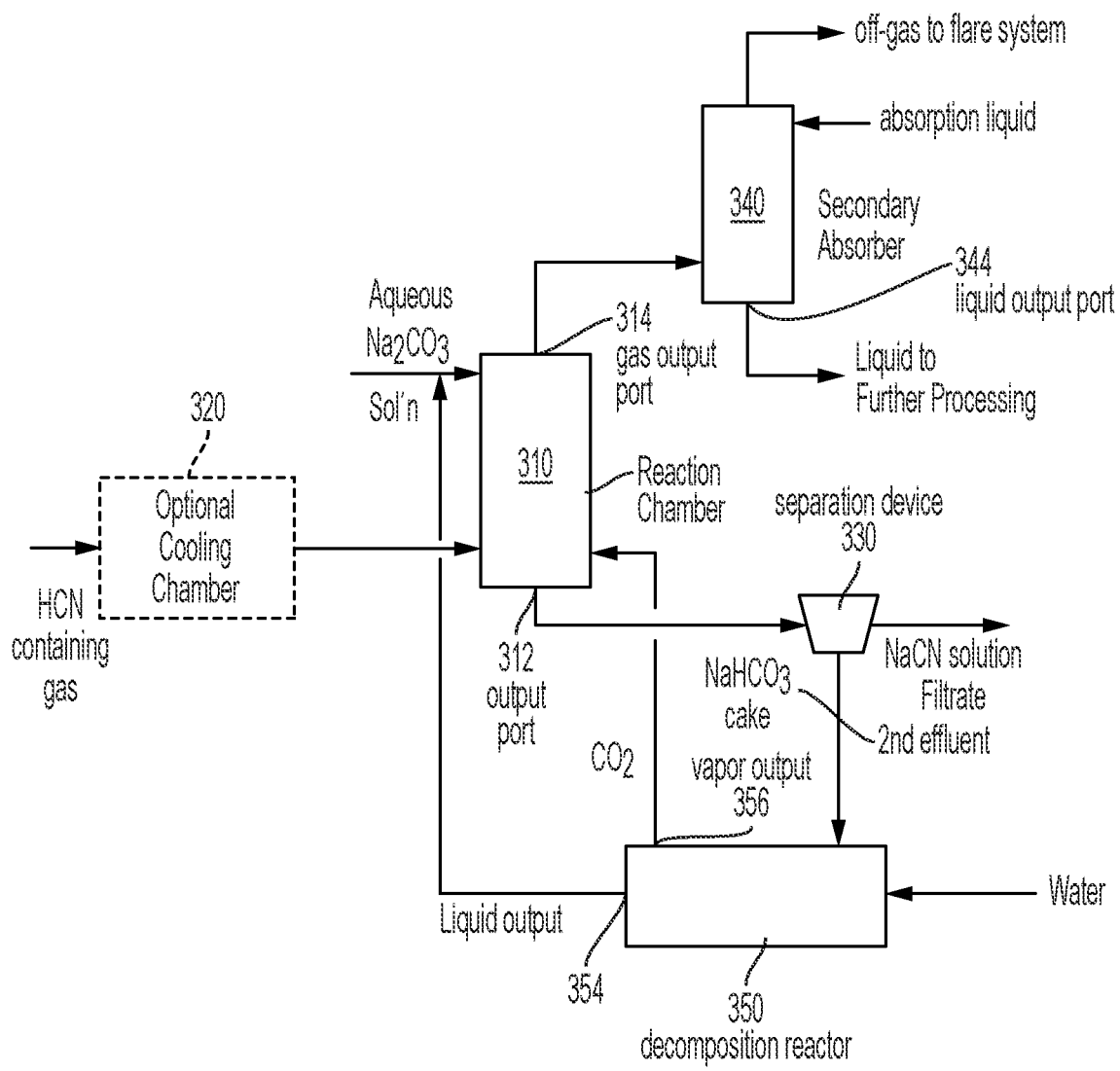
FIG. 3 shows a sodium bicarbonate precipitation process for producing NaCN solution using sodium carbonate as the primary sodium source with a secondary absorber and integrating a sodium bicarbonate decomposition step.

FIG. 3 shows a preferred treatment of the bicarbonate cake separated from the reaction chamber liquid effluent in separation device 330. This cake is fed to a $NaHCO_3$ decomposition reactor 350 along with water and converted to $Na_2CO_3$ according to Reaction (4). See for example U.S. Pat. Nos. 3,451,767, 5,609,838, 3,113,834, and 6,609,761.

Both a liquid and vapor stream are produced in the $NaHCO_3$ decomposition reactor 350 and are outputted via liquid output 354 and vapor output 356. The vapor stream is primarily $CO_2$ produced by the bicarbonate decomposition reaction plus optionally volatilized water. Because this stream may contain cyanide values from residual NaCN contained in, or on, the bicarbonate cake, it may be routed to reaction chamber 310 as shown. If the cyanide content is low enough, it may alternatively be sent to the flare.

The liquid output from the decomposition reactor 350 will contain substantial $Na_2CO_3$ which may be desirably recycled to the reaction chamber 310. Bicarbonate conversion need not be complete. Any residual bicarbonate in the $NaHCO_3$ decomposer liquid output will be recovered in the bicarbonate cake along with the net bicarbonate produced in reaction chamber 310. The $NaHCO_3$ decomposition reactor 350 is preferably operated at elevated temperature and above atmospheric pressure. Temperature is preferably greater than 80° C. and more preferably greater than 120° C. $NaHCO_3$ decomposition reactor 350 may be an empty or baffled horizontal or vertical vessel or it may be agitated or configured as a column. It may be adiabatic or be heated by any means known in the art.

Figure 4:
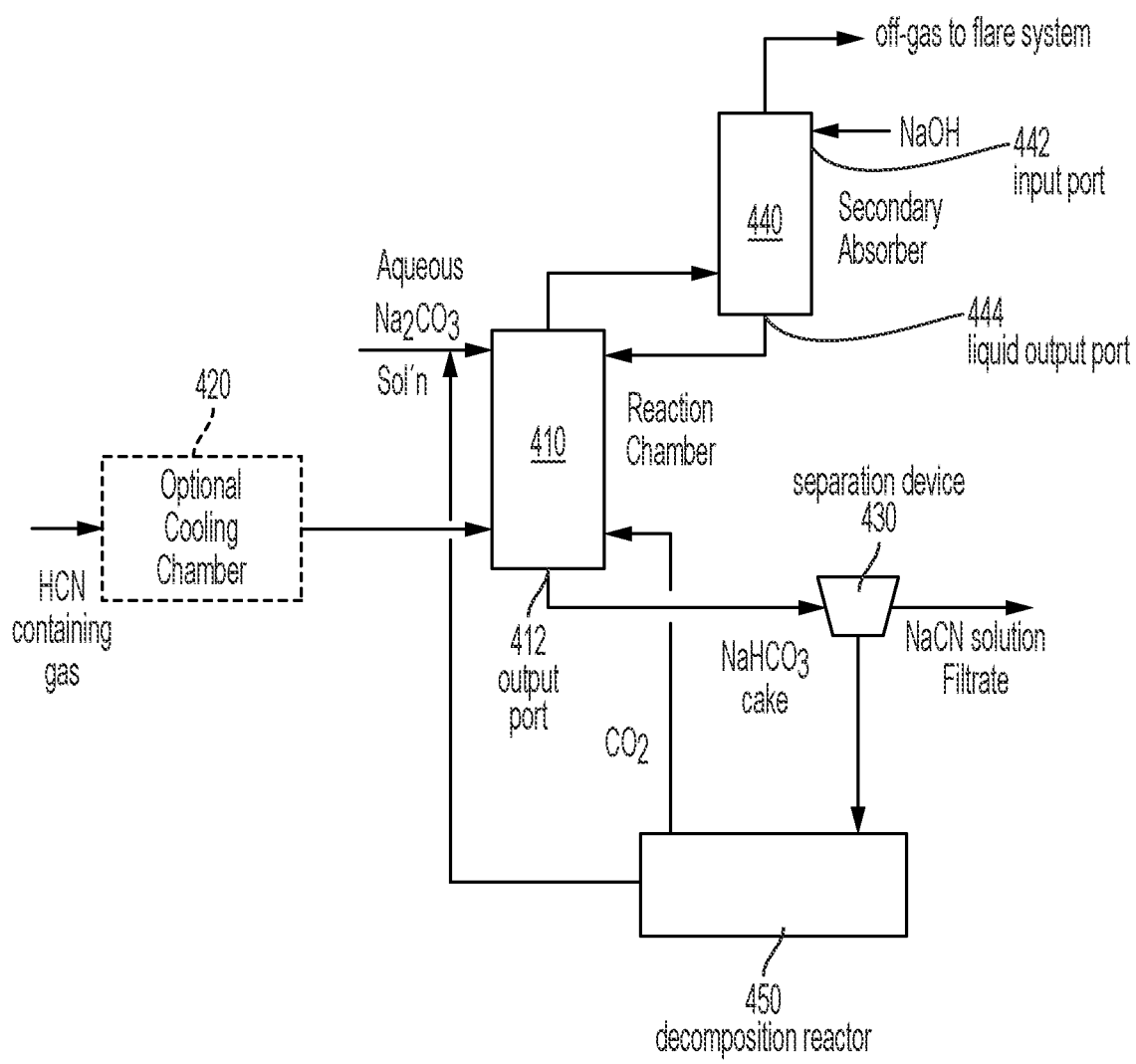
FIG. 4 shows a sodium bicarbonate precipitation process for producing NaCN solution using sodium carbonate as the primary sodium source with a secondary absorber and integrating a sodium bicarbonate decomposition step, wherein the secondary absorber uses NaOH as the absorption medium and wherein the liquid effluent from the secondary absorber is routed to the primary contacting zone.

FIG. 4 exemplifies the use of aqueous NaOH as the absorption liquid in the secondary absorber 440 via absorption liquid input port 442. In this case the liquid product comprises aqueous NaCN and can conveniently be added to the reaction chamber 410 via liquid output port 444. The secondary absorber 440 in this case is preferably a column, either tray or packed. Alternatively, an empty or baffled vessel may be used. Temperature is preferably lower than the primary absorber temperature.

The quantity of NaOH fed to the secondary absorber 440 should be in excess of the stoichiometric requirement to consume the HCN in the feed to the secondary absorber 440, but the amount in excess of the HCN may be 2 to 10%.

Figure 5:
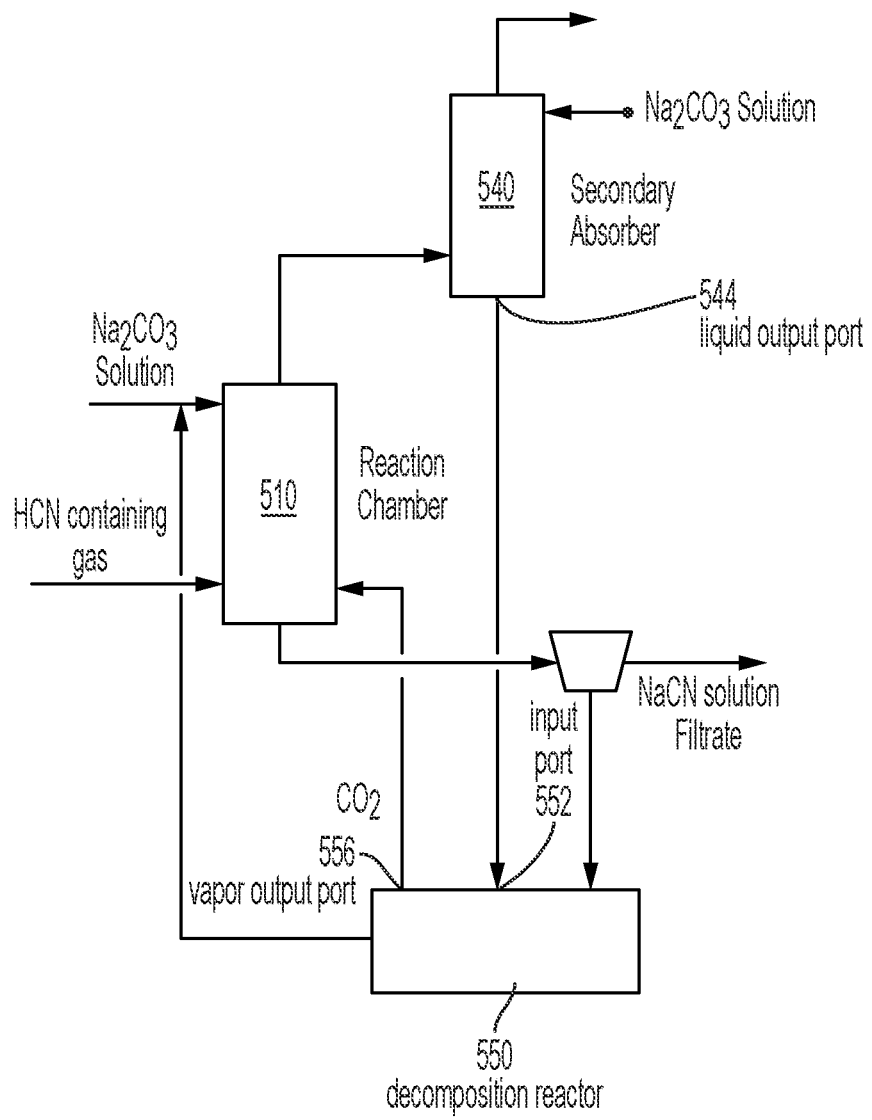
FIG. 5 shows a preferred embodiment in which sodium carbonate is the exclusive sodium source.

FIG. 5 shows an embodiment wherein aqueous $Na_2CO_3$ is employed as the absorption liquid in the secondary absorber 540. Preferably, the amount of $Na_2CO_3$ is in stoichiometric excess to the HCN in the secondary absorber feed. The secondary absorber 540 may be a tray or packed absorption column. A tray column is preferred. Alternatively, the contacting may take place in an empty of baffled vessel. Liquid effluent from the secondary absorber 540 is removed via liquid output port 544 and is desirably added to the $NaHCO_3$ decomposition reactor 550 via input port 552. This then has the effect of making $Na_2CO_3$ the source of all the Na in the NaCN product.

In a further preferred implementation, the off-gas from the $NaHCO_3$ decomposition reactor 550 is fed to the reaction chamber 510. In one example implementation of the invention, decomposition reactor 550 includes a vapor output port 556 through which a vapor stream of primarily $CO_2$ produced by the bicarbonate decomposition reaction plus optionally volatilized water is outputted. Because this stream may contain cyanide values from residual NaCN on the bicarbonate cake, it can be routed to the contacting reaction chamber 510 as shown. If the cyanide content is low enough, it may alternatively be sent to the flare.

Figure 6:
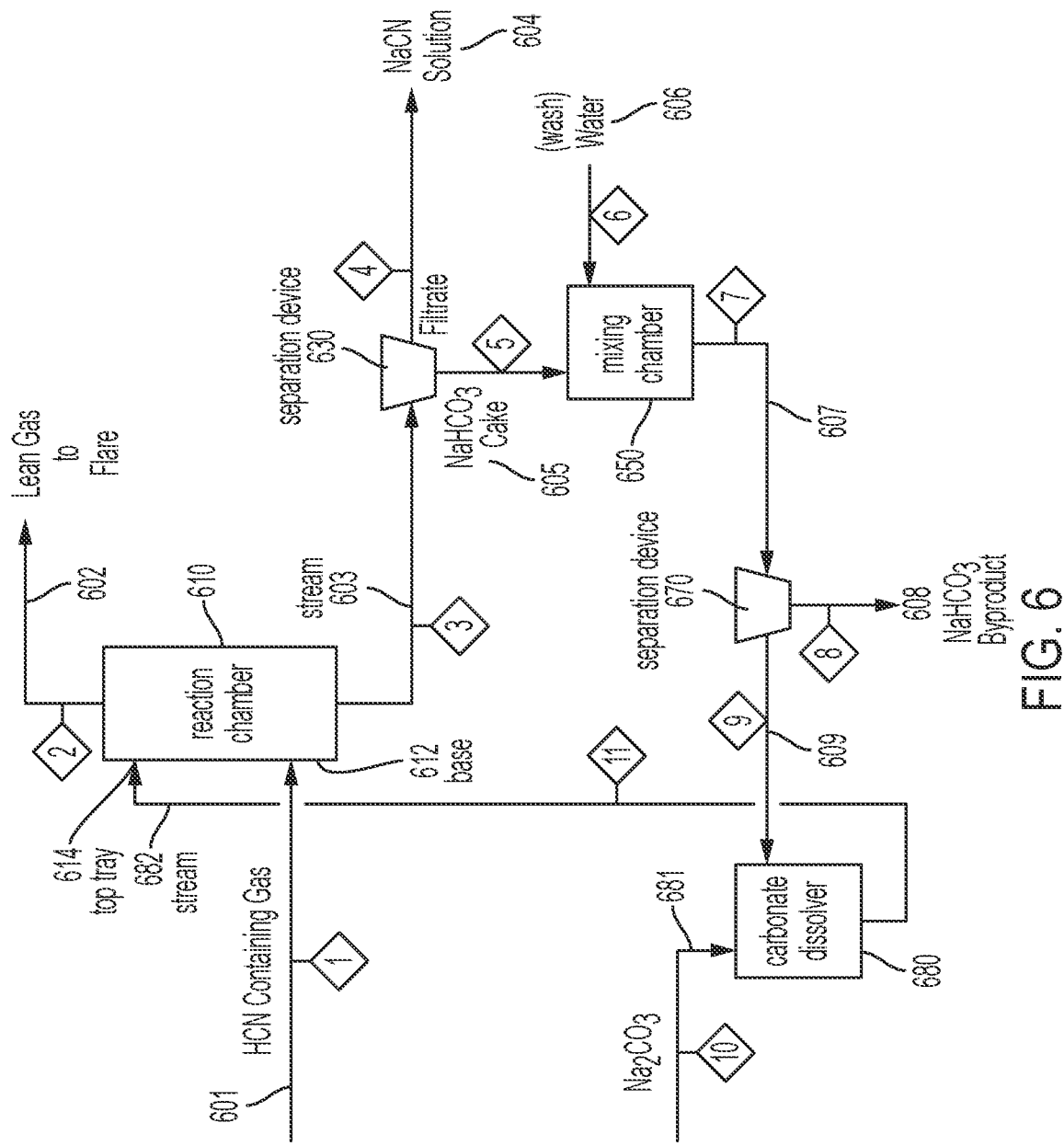
FIG. 6 shows a simplified flow diagram for a single stage process absorbing gaseous HCN in a minimum quantity of sodium carbonate solution and producing by-product sodium bicarbonate cake.

FIG. 6 is a simplified diagram for a single stage process absorbing gaseous HCN in a minimum quantity of sodium carbonate solution and producing by-product sodium bicarbonate cake. Such a configuration is suitable for a plant producing sodium cyanide solution.

In the example shown in FIG. 6, stream 601 is a gas containing about 8% HCN, typical of what would be produced by the well-known Andrussow process. The other gas present is a mixture primarily composed of nitrogen, hydrogen, ammonia, and numerous trace components. Although the Andrussow process requires elevated reaction temperatures, stream 601 has been cooled by direct and/or indirect heat exchange to a temperature less than 450° C., preferably less than 350° C. and more preferably less than 250° C. Delivery pressure is greater than 1 atmosphere, but typically less than 2 atmospheres absolute.

Stream 601 is contacted in the reaction chamber 610 with an aqueous solution of $Na_2CO_3$, Stream 682. Stream 682 may contain a small quantity of recycled sodium cyanide. Any trace components which do not affect the utility of the final product sodium cyanide solution may also be present. Preferably Stream 682 is at less than 80° C., more preferably at less than 60° C. and still more preferably at less than 40° C. Typically Stream 682 is at ambient conditions.

The reaction chamber 610 may be an absorption column and more preferably a trayed absorption column. Stream 601 is desirably introduced at the base 612 of the column and Stream 682 is introduced above the top tray 614 of the column.

Stream 602, the off-gas from the reaction chamber 610 is desirably essentially free of HCN. This gas is suitable for disposal by any means suitable for Andrussow process off gas. Typically, it is sent to a flare system. This stream 602 may contain considerable volatilized water.

Although it is believed that the initial reaction of the HCN is according to Reaction (2), the reaction chamber 610 conditions are preferably selected so that a significant amount of the $NaHCO_3$ initially produced is decomposed back to $Na_2CO_3$ according to Reaction (4), and this $Na_2CO_3$ further reacts with HCN. If the reaction chamber 610 conditions are chosen correctly, Stream 602 contains significant $CO_2$ produced by bicarbonate decomposition and Stream 603, the liquid product from the reaction chamber 610 contains less than one mol of bicarbonate per mol of NaCN. It is also desirable to maximize the conversion of $Na_2CO_3$ in the reaction chamber 610.

Sodium bicarbonate is substantially insoluble in Stream 603 and is recovered by solid-liquid separation in separation device 630. Centrifugation or filtration are preferred. The liquid product from this separation step, Stream 604, is suitable for use as a sodium cyanide solution product. The concentration of Stream 604 may be adjusted by dilution or evaporation if desired.

Stream 605, the solid cake from the separation step, can contain substantial NaCN and it is desirable to recover this NaCN. FIG. 6 exemplifies accomplishing this NaCN removal by reslurrying the bicarbonate cake in water in mixing chamber 650. Alternatively, the cake may be washed in the centrifuge or filter before being removed from the device. Thus, it is understood that some fraction of the wash water, Stream 606, may actually be applied to the $NaHCO_3$ cake, Stream 605, in the separation device 670 (e.g., centrifuge or filter). The new slurry of bicarbonate in water, Stream 607, is again subjected to solid liquid separation in separation device 670 using centrifugation or filtration, for example.

Stream 608, the cake from this second separation step, is byproduct $NaHCO_3$. It may contain a small amount of NaCN contaminant. This byproduct may be used, disposed of, subjected to further processing, for example to further reduce the NaCN content or sent to a bicarbonate decomposition reactor. Alternatively, a second reslurry step may be integrated into the process shown in FIG. 5.

The liquid product from this bicarbonate separation, Stream 609, is used to dissolve the $Na_2CO_3$ feed, Stream 681, in the carbonate dissolver 680, such as an agitated tank, for example. Preferably the dissolution is carried out at ambient conditions. This minimizes NaCN loss in the bicarbonate byproduct. It should be understood that Stream 606 may alternatively contain less than this amount of water and the balance may be fed to the dissolver 680 or directly to the reaction chamber 610. If the $Na_2CO_3$ is available as an aqueous solution, this may be fed to the dissolver 680 as stream 681 and the quantity of Stream 606 can be adjusted accordingly.

The NaCN solution from the bicarbonate solid separation step may be used as such or NaCN solids may be recovered by crystallization as is well known in the art. Alternatively, the concentration of the NaCN may be adjusted by diluting with or evaporating water.

While the foregoing description and the FIGS. 1-6 have been described with regard to the production of sodium cyanide (NaCN), it is understood that the other alkali metal carbonates will give similar results and yield the corresponding alkali metal cyanides.

EXAMPLES

Example 1 Reaction of HCN with Sodium Bicarbonate Solution

Figure 7:
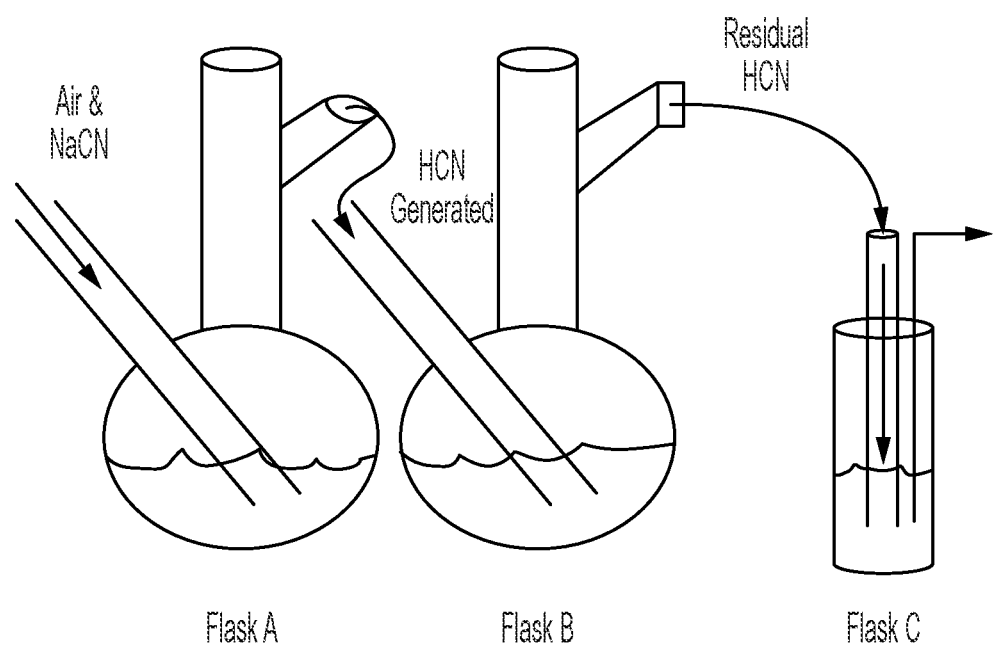
FIG. 7 shows the experimental set-up for Example 1 demonstrating a process of the invention.

Three one-liter flasks were assembled as shown in FIG. 7. Flask A is an HCN generator, Flask B is an absorber, and Flask C is a trap. At the start of the experiment, Flask A contains aqueous hydrochloric acid, Flask B contains an aqueous saturated sodium bicarbonate solution with initial pH 8.6, and Flask C contains an aqueous sodium hydroxide solution. All three flasks are at ambient temperature.

Over the course of an hour, 49.8 mg of CN was fed to Flask A as a NaCN solution. Air was also fed into flask A so that the generated HCN was swept into Flask B. The quantity of $NaHCO_3$ in Flask B was stoichiometrically equivalent to the 49.8 mg of CN fed to flask A. At the end of the hour, Flask B contained 37.5 mg of CN equivalents. This corresponds to a 75% yield of NaCN fed to Flask A. Flask C is analyzed and found to contain 7.5 mg of CN equivalents. Thus 45 out of 49.8 mg of CN equivalents are accounted for with 75% reacted with $NaHCO_3$.

Examples 2 and 3

Figure 8:
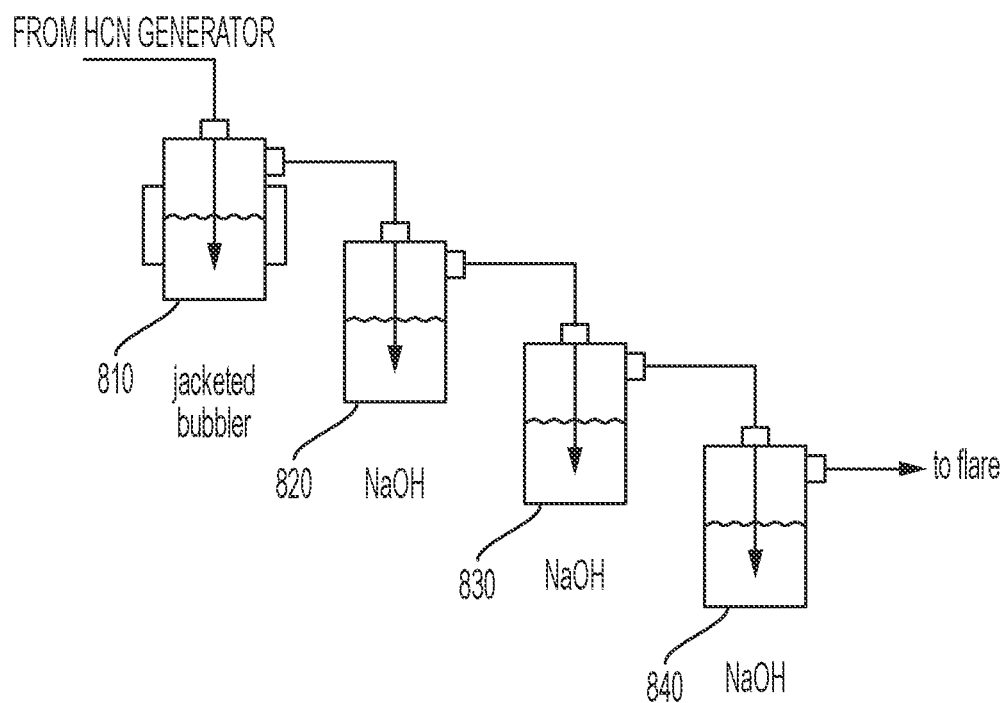
FIG. 8 shows the experimental set-up for Examples 2 and 3 demonstrating a process of the invention.

Experimental equipment was assembled as shown in FIG. 8. HCN was generated in a 1 liter 316SS autoclave (not shown in FIG. 8) by continuously pumping at a fixed rate an aqueous NaCN solution into the autoclave which contained a 50% sulfuric acid solution held at 45° C. The generated HCN was stripped from the sulfuric acid solution using nitrogen sparge gas. The resulting ca. 9% HCN in $N_2$ gas was then sparged through a series of three scrub bottles 810, 820, 830. The first scrub bottle 810 contained either sodium carbonate or sodium bicarbonate, was jacketed, and held at ca. 50° C. while the other two scrub bottles 820, 830 were not jacketed and thus at ambient temperature. The second and third scrub bottles 820, 830 had glass fritted spargers and contained 15% NaOH solution. The first bottle contained a test solution of either $NaHCO_3$ or $Na_2CO_3$. The experiment ran for three hours. At the end of the run the contents of the scrub bottles 810, 820, 830 were discharged and analyzed. A final scrub bottle 840 was present to ensure complete consumption of HCN. Table 1 summarizes the results of the experiments.

TABLE 1

|  | Example 2 | Example 3 |
|---|---|---|
| Charge to First Bubbler | 10% $NaHCO_3$ | 7.5% $Na_2CO_3$ |
| Temperature of first bubbler | 52-55 | 71.5 |
| Equivalents charged to first bubbler | 0.298 | 0.381 |
| Mols NaCN fed to generator | 0.299 | 0.362 |
| $N_2$ flow rate L/min | 0.4 | 0.9 |
| Mols NaCN in first bubbler | 0.042 | 0.163 |
| Mols HCN in first bubbler | 0.07 | 0.033 |
| Mols NaCN in $2^{nd}$ and $3^{rd}$ bubbler | 0.08 | 0.12 |
| CN accountability | 64% | 88% |
| % fed HCN in first bubbler as NaCN | 14.1 | 45 |
| % fed HCN in first bubbler as HCN | 23.4 | 9.1 |
| Total % fed HCN in first bubbler | 37.5 | 54.1 |

These results demonstrate that HCN can be successfully reacted with aqueous $Na_2CO_3$ to produce NaCN and that $NaHCO_3$ can be simultaneously converted to $Na_2CO_3$. The absorption is seen to be favored by elevated temperature.

The claimed invention is:

1. A method of producing an alkali metal cyanide comprising the steps of:
   contacting hydrogen cyanide with an aqueous solution of an alkali metal carbonate or of a mixture of alkali metal carbonate and alkali metal bicarbonate in a reaction chamber under reaction conditions sufficient to produce an aqueous alkali metal cyanide solution,
   removing a gaseous effluent from the reaction chamber,
   removing the aqueous alkali metal cyanide solution from the reaction chamber as a liquid effluent, and
   separating any solid alkali metal bicarbonate present in the liquid effluent from the aqueous alkali metal cyanide solution.

2. A method of producing an alkali metal cyanide according to claim 1 wherein the alkali metal is lithium, sodium or potassium.

3. A method of producing an alkali metal cyanide according to claim 2 wherein the alkali metal is sodium.

4. A method of producing an alkali metal cyanide according to claim 1 wherein the contacting step comprises contacting a hydrogen cyanide containing gas with the aqueous solution of an alkali metal carbonate or of a mixture of alkali metal carbonate and alkali metal bicarbonate under reaction conditions sufficient to produce an aqueous alkali metal cyanide solution.

5. A method of producing an alkali metal cyanide according to claim 4 further comprising, prior to the contacting step, the step of cooling the hydrogen cyanide containing gas.

6. A method of producing an alkali metal cyanide according to claim 1, further comprising the step of converting the separated alkali metal bicarbonate to alkali metal carbonate in the presence of water and, optionally, recycling said aqueous alkali metal carbonate to the contacting step.

7. A method of producing an alkali metal cyanide according to claim 1, further comprising the step of removing hydrogen cyanide from the gaseous effluent.

8. A method of producing an alkali metal cyanide according to claim 1, wherein the step of removing hydrogen cyanide from the gaseous effluent from the reaction chamber comprises scrubbing the gaseous effluent with aqueous NaOH.

9. A method of producing an alkali metal cyanide comprising the steps of:
contacting hydrogen cyanide with an aqueous solution of an alkali metal carbonate or of a mixture of alkali metal carbonate and alkali metal bicarbonate under reaction conditions sufficient to produce an aqueous alkali metal cyanide solution,
wherein the aqueous solution of an alkali metal carbonate or of a mixture of alkali metal carbonate and alkali metal bicarbonate is contacted with excess hydrogen cyanide.

10. A method for producing sodium cyanide comprising the steps of:
reacting hydrogen cyanide with an aqueous solution of sodium carbonate in a first reaction chamber under reaction conditions sufficient to produce an aqueous sodium cyanide solution,
removing a gaseous effluent from the reaction chamber,
removing the aqueous sodium cyanide solution from the reaction chamber as a liquid effluent, and
separating any solid sodium bicarbonate present in the liquid effluent from the aqueous sodium cyanide solution.

11. A method of producing sodium cyanide according to claim 10, wherein the contacting step comprises contacting a hydrogen cyanide containing gas with the aqueous solution of sodium carbonate or a mixture of sodium carbonate and sodium bicarbonate under reaction conditions sufficient to produce an aqueous sodium cyanide solution.

12. A method of producing sodium cyanide according to claim 11 further comprising, prior to the contacting step, the step of cooling the hydrogen cyanide containing gas.

13. A method of producing sodium cyanide according to claim 10, wherein further processing of the liquid stream comprises separating solid sodium bicarbonate from the aqueous sodium cyanide solution.

14. A system for producing alkali metal cyanide comprising:
a reaction chamber for contacting hydrogen cyanide with an aqueous solution of an alkali metal carbonate or of a mixture of an alkali metal carbonate and an alkali metal bicarbonate to produce an alkali metal cyanide solution;
a gas phase output port in communication with the reaction chamber for discharging a gaseous effluent created in the reaction chamber;
a liquid phase output port in communication with the reaction chamber for discharging a liquid effluent created in the reaction chamber;
a separation device for receiving the liquid effluent and separating a solid bicarbonate from the liquid effluent.

15. A system of claim 14, further comprising:
a secondary absorber for receiving the gaseous effluent from the gas phase output port and recovering residual hydrogen cyanide.

16. A system of claim 15, wherein the secondary absorber includes an absorption liquid input port for receiving an absorption liquid for recovering the residual hydrogen cyanide.

17. A system of claim 16, wherein the absorption liquid is aqueous NaOH, aqueous KOH or aqueous $Na_2CO_3$.

18. A system of claim 17, wherein the secondary absorber includes a liquid output port for routing a liquid effluent back to the reaction chamber.

19. A system of claim 15, wherein the secondary absorber includes a liquid output port for routing a liquid effluent to a decomposition reactor.

20. A system of claim 14 further comprising:
a cooling chamber for cooling the gaseous hydrogen cyanide prior to entering the reaction chamber.

21. A system of claim 14 further comprising:
a decomposition reactor that receives a bicarbonate cake from the separation device and converts the bicarbonate cake to $Na_2CO_3$, wherein the decomposition reactor optionally includes a liquid output port for routing the $Na_2CO_3$ back to the reaction chamber and wherein the decomposition reactor optionally includes a vapor output port for removing $CO_2$.

* * * * *